United States Patent
Himberger et al.

(10) Patent No.: US 7,489,246 B2
(45) Date of Patent: Feb. 10, 2009

(54) SYSTEM AND METHOD TO RECORD ENVIRONMENTAL CONDITION ON AN RFID TAG

(75) Inventors: Kevin David Himberger, Durham, NC (US); Clark Debs Jeffries, Chapel Hill, NC (US); Mohammad Peyravian, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/766,883

(22) Filed: Jun. 22, 2007

(65) Prior Publication Data

US 2007/0241905 A1 Oct. 18, 2007

Related U.S. Application Data

(63) Continuation of application No. 11/132,535, filed on May 19, 2005, now Pat. No. 7,327,260.

(51) Int. Cl.
*G08B 13/14* (2006.01)

(52) U.S. Cl. ............ 340/572.1; 340/572.8; 340/870.17; 340/584; 340/588; 340/601; 235/440

(58) Field of Classification Search .............. 340/572.1, 340/572.4, 572.8, 870.16, 870.17, 5.9, 5.92, 340/584, 585, 588, 601, 602; 235/375, 440, 235/462.43, 462.46, 487, 98 R
See application file for complete search history.

(56) References Cited

U.S. PATENT DOCUMENTS

| | | | |
|---|---|---|---|
| 5,381,137 A | 1/1995 | Ghaem et al. | |
| 5,448,220 A | 9/1995 | Levy | |
| 5,528,228 A * | 6/1996 | Wilk | ........................... 340/540 |
| 5,798,694 A | 8/1998 | Reber et al. | |
| 5,835,012 A * | 11/1998 | Wilk | ...................... 340/539.26 |
| 5,936,523 A | 8/1999 | West | |
| 6,046,678 A * | 4/2000 | Wilk | ........................ 340/686.1 |
| 6,285,282 B1 | 9/2001 | Dorenbosch et al. | |
| 6,712,276 B1 | 3/2004 | Abali | |
| 6,726,099 B2 | 4/2004 | Becker et al. | |
| 6,806,808 B1 | 10/2004 | Watters et al. | |
| 6,919,803 B2 | 7/2005 | Breed | |

FOREIGN PATENT DOCUMENTS

WO 03098175 A1 11/2003

OTHER PUBLICATIONS

"New temp-tracking RFID label from KSW", inpharma.com, May 7, 2004, pp. 1-2. www.inpharma.com/news/news-NG.asp?n=53297-new-temp-tracking.

* cited by examiner

*Primary Examiner*—Toan N Pham
(74) *Attorney, Agent, or Firm*—Duke W. Yee; Arthur J. Samodovitz; Theodore D. Fay, III

(57) ABSTRACT

System and method for recording temperature on an RFID tag. A first RFID tag is attached to a container. The first RFID tag includes a temperature sensor. The container contains a multiplicity of packages. A multiplicity of second RFID tags are attached to the multiplicity of packages, respectively. The first RFID tag transmits temperature information to the multiplicity of second RFID tags. In response, the multiplicity of second RFID tags record the temperature information. Consequently, there is no need for expensive temperature sensors on the multiplicity of RFID tags on the packages. According to features of the present invention, the first RFID tag is an active RFID tag, and the multiplicity of second RFID tags are passive RFID tags. The first RFID tag also transmits other information to the multiplicity of second RFID tags to enable the second RFID tags to authenticate the temperature information. Other types of environmental sensors such as a humidity sensor or vibration sensor can substitute for the temperature sensor.

17 Claims, 4 Drawing Sheets

SYSTEM AND METHOD TO RECORD ENVIRONMENTAL CONDITION ON AN RFID TAG

This application is a continuation of application Ser. No. 11/132,535, filed May 19, 2005, now U.S. Pat. No. 7,327,260.

BACKGROUND

The present invention relates generally to RFID tags, and more particularly to RFID tags to record temperature or other environmental conditions.

Active RFID tags are well known today. For example, the Matrics Group manufactures "MicroSensys™" Active RFID tags, and KSW Microtec manufactures "Smart Active Label™" Active RFID tags. An Active RFID tag includes a small battery, and transmits RF signals via an integral antenna. The battery adds significant cost to the RFID tag. The RFID may be preprogrammed with an identity that represents the identity of the product which bears the RFID tag. The transmitted RF signals typically include the identity of the Active RFID tag. If the Active RFID tag includes data such as a recorded temperature, the Active RFID tag may transmit the data as well. An Active RFID tags can effectively transmit to a receiver up to 100 meters away.

Passive RFID tags are also well known today. A Passive RFID tag does not include a battery; instead, the Passive RFID tag has an integral antenna which receives RF signals from an Active RFID tag or remote transceiver. The transmitted RF signals power the Passive RFID tag, i.e. the Passive RFID tag captures the energy of the RF signals which it receives and uses the energy to drive transceiver and other circuitry on the Passive RFID tag. The transceiver circuitry on the Passive RFID tag transmits the identity coded into the Passive RFID to identify the product which bears the Passive RFID tag. The Passive RFID tag may also include a memory to store any type of information transmitted by the Active RFID tag or other remote transceiver. Typically, Passive RFID tags have a range of about three meters.

The known remote transceiver reads the identity information broadcast by the Passive RFIDs or Active RFIDs. The remote transceiver can read RFID tags on packages contained in a box to determine what packages the box contains or to confirm that the packages are all there. Also, the remote readers can read RFID tags on packages at a cash register to determine an amount to charge to the customer (as does a known bar code reader). Also, the remote readers can detect packages at a store exit which bear RFID tags which have not been "disabled" at a cash register, and thereby detect shop lifters.

It was also known for an Active or Passive RFID tag to include a temperature, humidity or other environmental sensor. For example, the Matrics Group MicroSensys™ Active RFID tags and KSW Microtec Smart Active Label™ Active RFID tags include temperature sensors. The temperature sensor measures the ambient temperature, and circuitry on the RFID tag containing the sensor records information about the temperature, such as whether the ambient temperature rose above a predetermined upper limit or fell below a predetermined lower limit. (In the case of the Passive RFID tag containing the temperature sensor, the Passive RFID tag can only monitor and store the temperature when the Passive RFID tag is energized by an external RF signal.) For example, if the RFID tag is attached to a temperature sensitive product such as a food package, the RFID tag will record whether the food was exposed to excessively hot or cold temperatures during shipment. The RFID tag may also periodically record temperature samples over time. If the RFID tag stores a single indication whether the temperature went outside a tolerable range, the RFID tag needs only a "Read Once Memory". If the RFID tag stores periodic temperatures, then the RFID tag needs a more expensive "Write Many Memory". Maintaining the product within a specified temperature range during shipment may be a condition to pay the shipper, and for a customer to accept the product. While such "composite" RFID tags are important, they tend to be costly due to the requirement for the temperature sensor, especially when there are many packages to monitor.

An object of the present invention is to record temperature or other environmental condition on an RFID tag in a cost effective manner.

SUMMARY OF THE INVENTION

The present invention resides in a system and method for recording temperature on an RFID tag. A first RFID tag is attached to a container. The first RFID tag includes a temperature sensor. The container contains a multiplicity of packages. A multiplicity of second RFID tags are attached to the multiplicity of packages, respectively. The first RFID tag transmits temperature information to the multiplicity of second RFID tags. In response, the multiplicity of second RFID tags record the temperature information. Consequently, there is no need for expensive temperature sensors on the multiplicity of RFID tags on the packages.

According to features of the present invention, the first RFID tag is an active RFID tag, and the multiplicity of second RFID tags are passive RFID tags. The first RFID tag also transmits other information to the multiplicity of second RFID tags to enable the second RFID tags to authenticate the temperature information. Other types of environmental sensors such as a humidity sensor or vibration sensor can substitute for the temperature sensor.

DETAILED DESCRIPTION OF THE PREFERRED EMBODIMENTS

DETAILED DESCRIPTION OF THE PREFERRED EMBODIMENTS

Figure 1:
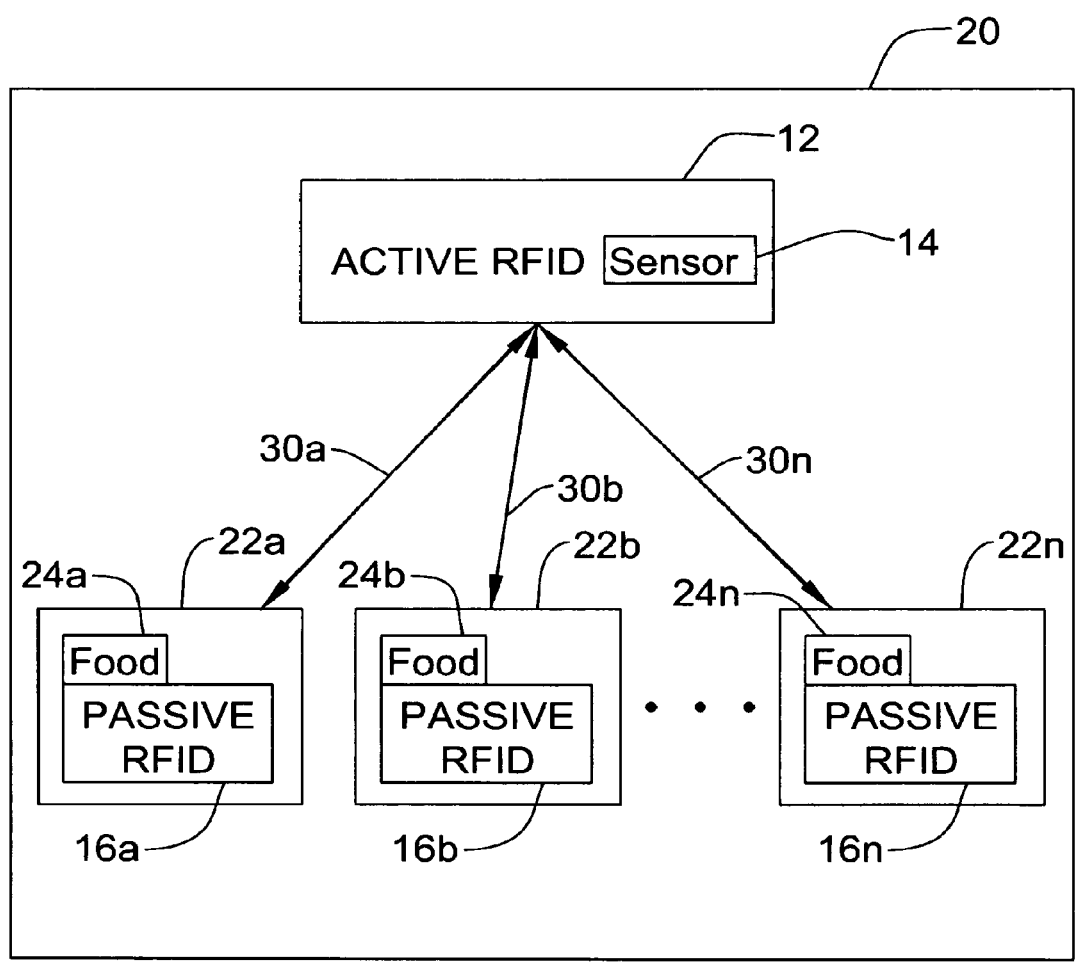
FIG. 1 is a block diagram of a distributed RFID system which incorporates the present invention.

The present invention will now be described in detail with reference to the figures. FIG. 1 illustrates a distributed RFID system generally designated 10 according to the present invention. System 10 comprises an Active RFID tag 12 with an integral temperature (or other type of environmental condition) sensor 14. System 10 also includes a multiplicity of Passive RFID tags 16a,b . . . n, without a temperature sensor. In the illustrated embodiment, Active RFID tag 12 is attached to the inside of a wall of a box or container 20 such that sensor 14 measures the temperature within the container. In the illustrated embodiment, the multiplicity of Passive RFID tags 16a,b . . . n are attached to the outside of a wall of respective packages 22a,b . . . n. Container 20 contains packages 22a,b . . . n. Packages 22a,b . . . n contain a temperature sensitive product 24a,b . . . n such as a food product, plant, certain electronics, etc. Active RFID tag 12 transmits RF signals to Passive RFID tags 16a,b . . . n as indicated by arrows 30a,b . . . n. The RF signals provide temperature, authentication and other information to the Passive RFID tags 16a,b . . . n as described below, as well as provide power to operate the Passive RFID tags 16a,b . . . n. After authenticating the source of the RF information, each of the Passive RFID tags 16a,b . . . n stores the temperature information (sensed by sensor 14) to record whether the product was exposed to a temperature which was too high or too low. Subsequently, a customer can read the temperature recorded on the Passive RFID tags 16a,b . . . n to determine whether the respective package/product has been ruined by improper temperature conditions.

Figure 2:
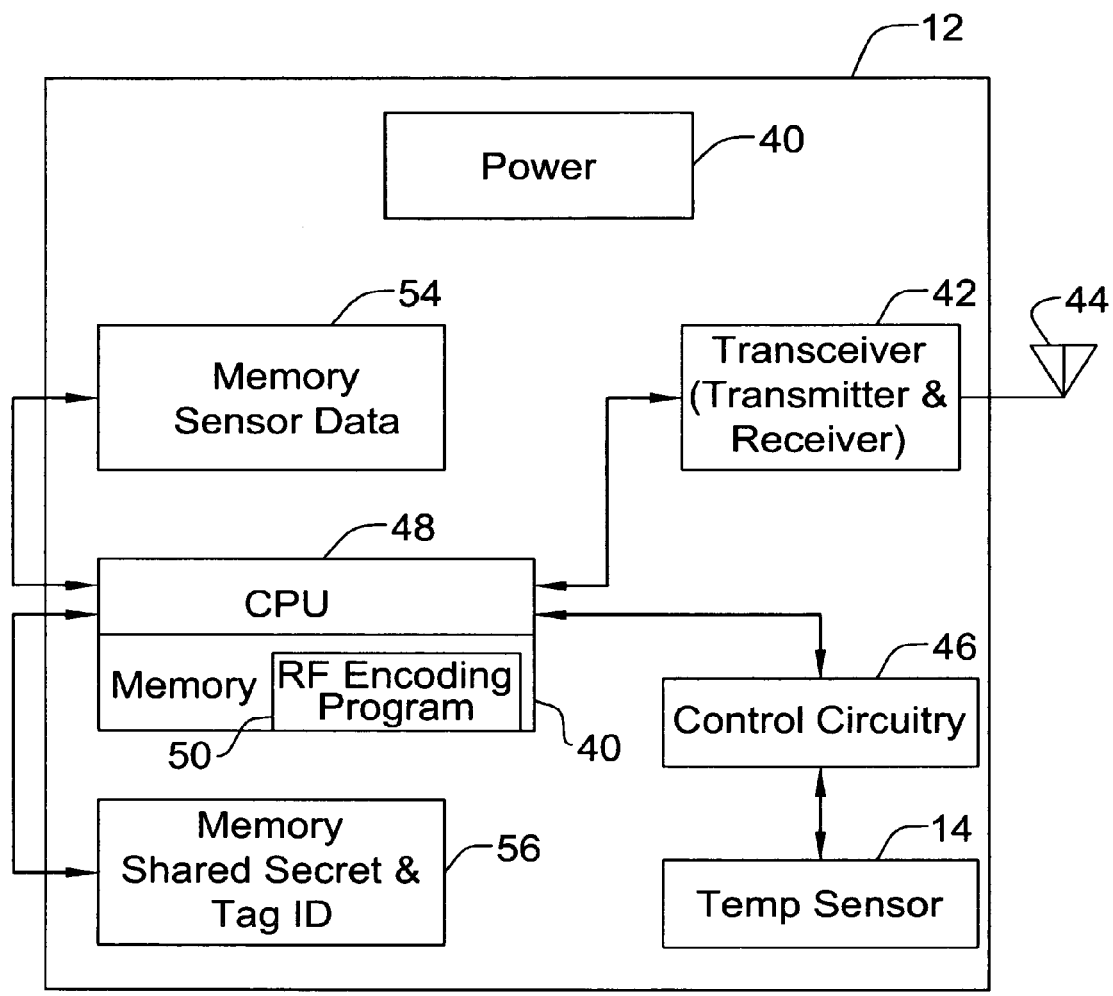
FIG. 2 is a block diagram of an Active RFID tag with a temperature sensor, within a container of the distributed RFID system of FIG. 1.

FIG. 2 illustrates Active RFID tag 12, in more detail. Active RFID tag 12 includes known type of temperature sensor 14 (such as one sold by KSW-Microtec corp.), battery 40 (such as a Lithium-Ion battery), electronic transceiver circuitry 42, antenna 44, integrated circuit CPU 48, memory 49 (such as EEPROM or SRAM), memory 54 (such as EEPROM or SRAM) and memory 56 (such as EEPROM or SRAM). Active RFID tag 12 also includes electronic control circuitry 46, an RF encoding program 50 in memory 49, and a "shared secret" (used for authentication with the Passive RFID tags 16a,b . . . n) in memory 56, according to the present invention. Transceiver 42 includes a transmitter and a receiver coupled to antenna 44 to transmit and receive RF signals. Control circuitry 46 is coupled to temperature sensor 14 and provides temperature information to CPU 48 for storage in memory 54. For example, control circuitry 46 can periodically monitor the temperature sensor 14, compare the monitored temperature samples to predetermined upper and lower limits, and report to CPU 48 if and when the sensed temperature is above the upper limit or below the lower limit. RF encoding program 50 executes on CPU 48 to initiate broadcast to the Passive RFID tags 16a,b . . . n of information about the temperature in the container 20. For example, Active RFID tag 12 can broadcast if and when the temperature sensed by sensor 14 went above the upper limit or below the lower limit. Memory 56 also stores an identity of Active RFID tag 12. An RF transmitter (not shown), at a factory or other location where the Active RFID tag 12 is initialized, writes the shared secret into memory 56 of Active RFID tag 12. The shared secret is some numerical value or information shared by both the Active RFID tag 12 and all of the associated Passive RFID tags 16a,b . . . n (in the same container). The RF encoding program 50 includes a hashing algorithm to hash the temperature information stored in memory 54 with the shared secret, and broadcast the hash value with the temperature information. This enables the associated Passive RFID tags 16a,b . . . n (in the same container) to authenticate the broadcast by independently computing the hash value based on their own stored shared secret and the broadcast temperature information; i.e. confirm that the received temperature information was broadcast by the associated, Active RFID tag 12, and not some other Active RFID tag in another container or a remote transceiver from which the Passive RFID tags 16a,b . . . n should not receive temperature or other information. There may be other containers with other Active RFID tags in the vicinity/RF range of container 20, and the temperature information they broadcast should not be recorded by Passive RFID tags 16a,b . . . n.

Figure 3:
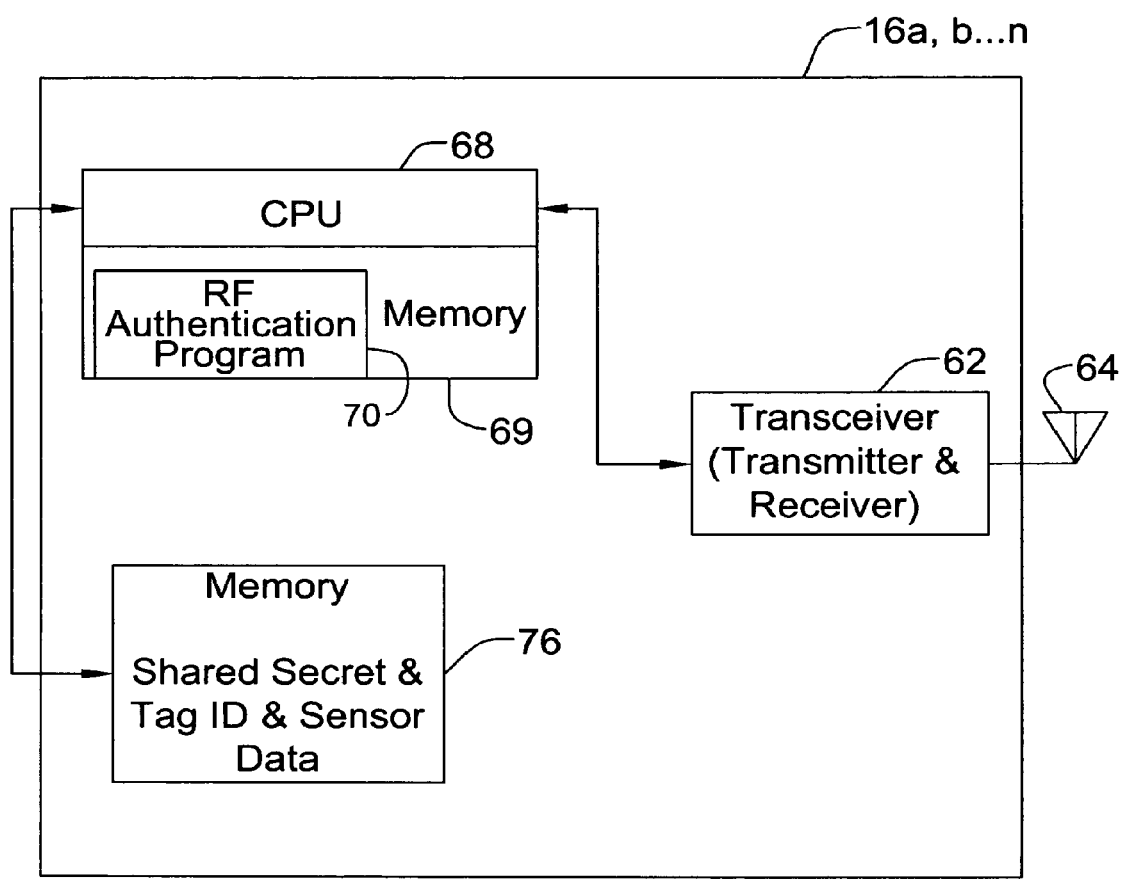
FIG. 3 is a block diagram of a Passive RFID tag (without a temperature sensor), within each of a multiplicity of packages within the container of the distributed RFID system of FIG. 1.

FIG. 3 illustrates each Passive RFID tag 16a,b . . . n in more detail. Each Passive RFID tag 16a,b . . . n comprises known types of CPU 68, memory 69 (such as EEPROM or SRAM), transceiver 62, antenna 64 for the transmitter and receiver, and memory 76 (such as EEPROM or SRAM). Memory 69 contains an RF authentication program 70 which executes on CPU 68 according to the present invention to authenticate a received RF signal and, if authentic, store temperature and other information contained in the RF signal. Memory 76 stores the shared secret and Passive RFID tag identification. Memory 76 also stores the temperature information transmitted by Active RFID tag 12, according to the present invention. An RF transceiver (not shown), at a factory or other location where the Passive RFID tags 16a,b . . . n are initialized, writes the unique Passive RFID tag identification and the shared secret into memory 76 of each Passive RFID tag 16a,b . . . n. The shared secret stored in each Passive RFID tag 16a,b . . . n corresponds to the shared secret stored in Active RFID tag 12. As explained above, the shared secret enables each Passive RFID tag 16a,b . . . n to authenticate RF signals (including the temperature information) as originating from the associated Active RFID tag 12 (and not some other source which is not sensing the temperature within container 20.).

Figure 4:
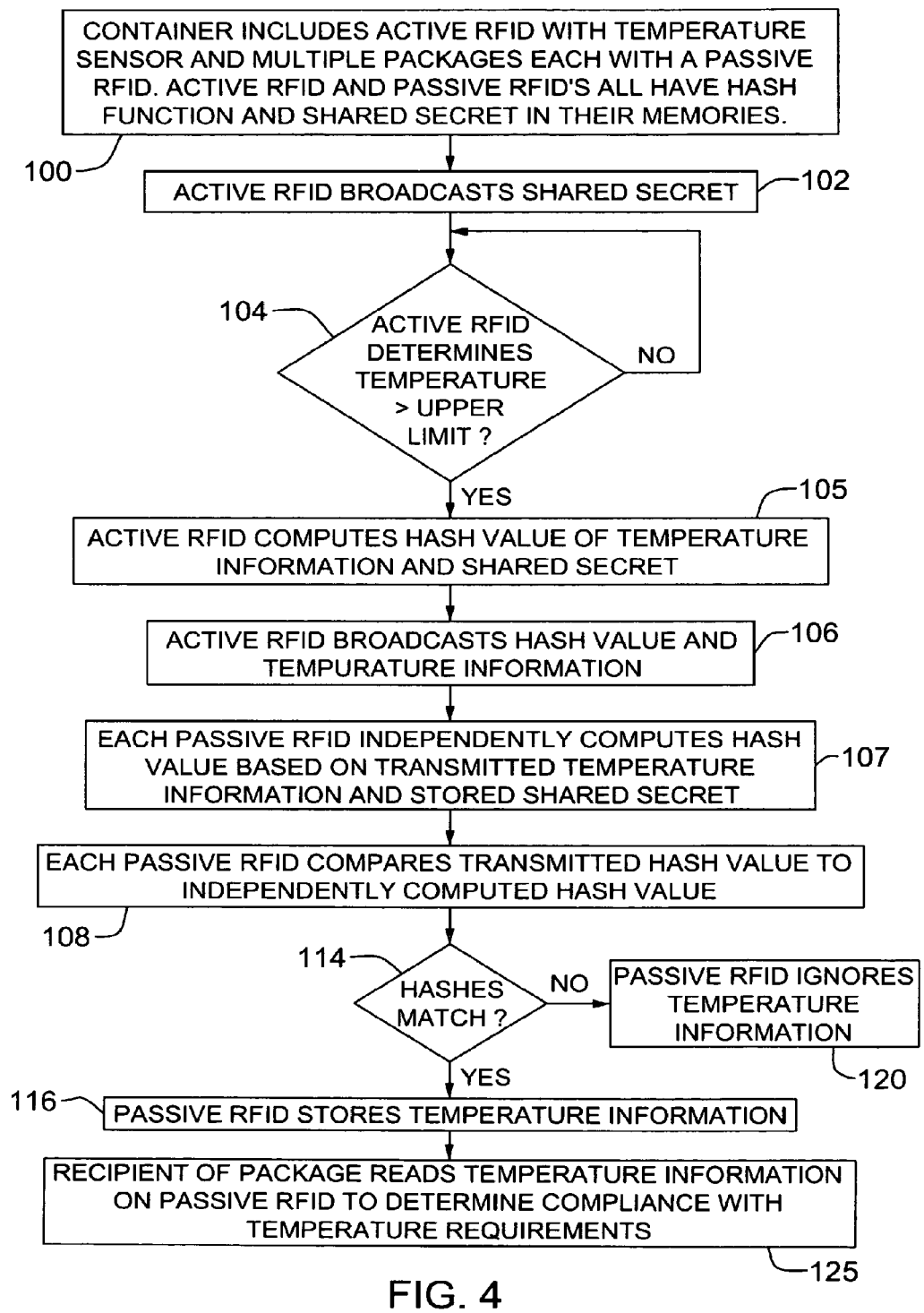
FIG. 4 is a flow chart of operation of the Active RFID tag of FIG. 2 and each of the Passive RFID tags of FIG. 3, within the distributed RFID system of FIG. 1.

FIG. 4 illustrates in more detail the function of control circuity 46 and RF encoding program 50 of Active RFID tag 12 and RF authentication program 70 of each of the Passive RFID tags 16a,b . . . n, during use. At the time of step 100, Active RFID tag 12 is attached to an inside wall of container 20 to monitor the temperature within container 20, Passive RFID tags 16a,b . . . n are attached to walls of respective packages 22a,b . . . n, and packages 22a,b . . . n are contained within container 20. A transceiver at the factory where the RFID tags are attached to the container and packages can write the shared secret into the Active RFID tag and Passive RFID tags. The transceiver can write the shared secret into the Active RFID tag and Passive RFID tags before attachment to the container and packages. Alternately, as the container (with the Active RFID tag) containing the packages (with the Passive RFID tags) passes down a conveyor toward a shipping truck, a remote transceiver can write the shared secret into the Active RFID tag and Passive RFID tags. The remote transceiver would write a different shared secret for each set of Active and Passive RFID tags in the same container. Alternately, a transmitter at the factory could write the shared secret into the Active RFID tag, and later, the Active RFID tag would write the shared secret into the associated Passive RFID tags in the same container. If the Passive RFID tag includes a "write once read many memory" it will just accept the first transmission of a shared secret to its memory. In another implementation, the passive RFID will accept a shared secret accompanied by a preprogrammed factory key.

Some time later (for example, during shipment), temperature sensor 14 in Active RFID tag 12 detects that the temperature within container 20 has exceeded a predetermined upper limit, and control circuitry 46 notifies RF encoding program 50 (step 104). In response, RF encoding program 50 begins a process, as follows, to broadcast an "over temperature" signal to all of the Passive RFID tags 16a,b . . . n. First, the RF encoding program 50 computes a hash value for the temperature information (i.e. the "over temperature" signal) and the shared secret (step 105). Then, the RF encoding program sends the hash value and the temperature information to the transceiver 42 which broadcasts the hash value and temperature information (step 106). In response to the broadcast, each Passive RFID tag 16a,b . . . n is activated with power from the broadcast, and attempts to authenticate the broadcast as follows. The RF authentication program 70 in each Passive RFID tag 16a,b . . . n independently computes its own hash value for the temperature information which it received in the broadcast and the shared secret which it has stored in its memory 76 (step 107). Then, the RF authentication program 70 compares the hash value that it independently computed to the hash value contained in the broadcast (step 108). If they match (decision 114, yes branch), then the broadcast is authentic, i.e. transmitted by Active RFID 12 which is associated with Passive RFIDs 16a,b . . . n and authorized to send temperature information to Passive RFIDs 16a,b . . . n. Consequently, each Passive RFID tag 16a,b . . . n stores the broadcast temperature it its memory 76 (step 116). Later, when the packages are received by their intended recipient, the intended recipient can use an external transceiver to read the temperature information stored in memory 76 to determine if the product in the packages was exposed to an excessive (or possibly too low) temperature (step 118).

Refer again to decision 114, no branch where the two values do not match. This will be the case when another Active RFID tag, in another container or an external RF transmitter, has transmitted the hash value and temperature information. In such a case, the Passive RFID tags 16a,b . . . n will ignore the received temperature information, i.e. not store the broadcast temperature information (step 120). In such a case, the hash value and temperature information were probably broadcast by an Active RFID tag in a neighboring container. Because the neighboring container is situated at a different location than container 20, the temperature within the neighboring container can be different than the temperature within container 20. It is also possible that the hash value and temperature information were broadcast by a hacker, i.e. a mischievous person attempting to discredit the contents of the packages to falsely indicate unfavorable environmental conditions and spoilage. In either case, the transmitted hash value will not match the independently computed hash value, and the Passive RFID tags 16a,b . . . n will ignore the received temperature information.

In accordance with the present invention, the approximate temperature of each package is recorded on the Passive RFID tag for the package, and an expensive temperature sensor was not required for any of the Passive RFID tags. Instead, only a single temperature sensor was required for the multiplicity of Passive RFID tags 16a,b . . . n and respective packages 22a,b . . . n.

Based on the foregoing, a system and method for recording ambient temperature on Passive RFID tags have been disclosed. However, numerous modifications and substitutions can be made without deviating from the scope of the present invention. For example, instead of hashing the temperature information and the shared secret, the Active RFID 12 can broadcast the temperature information and shared secret, and rely on the each Passive RFID to compare its stored shared secret to that in the broadcast, and if they match, store the temperature information. Alternately, there is no need for a shared secret. Instead, the identity of Active RFID 12 is initially stored in memory of each Passive RFID 16a,b . . . n, and the Active RFID 12 broadcasts its identity with the temperature information. In response, each Passive RFID tag 16a,b . . . n compares the identity in the broadcast to the identity of the associated Active RFID in its memory, and if they match, stores the temperature information. Also, instead of a temperature sensor, the active RFID tag can include a vibration sensor (and transmit vibration information) if the products are sensitive to shock or include a humidity sensor (and transmit humidity information) if the products are sensitive to humidity. Also, other types of environmental sensors can substitute for the temperature sensor 14. The active RFID tag would transmit the vibration, humidity or other environmental condition information to the passive RFID tags in the same manner as described above (i.e. by including with the environmental information a hash of the shared secret and the environmental information), and the passive RFID tags would attempt to authenticate the environmental information (by computing a hash based on its stored shared secret and the transmitted environmental information). If the hashes match, the passive RFID tags would store the environmental information. Therefore, the present invention has been disclosed by way of illustration and not limitation, and reference should be made to the following claims to determine the scope of the present invention.

The invention claimed is:

1. A method of recording temperature on RFID tags, the method comprising:

attaching a first RFID tag to a container, the first RFID tag including a temperature sensor, the container containing a plurality of packages, each of a plurality of second RFID tags attached to a respective one of the plurality of packages;

responsive to the first RFID tag transmitting temperature information to the plurality of second RFID tags, the plurality of second RFID tags recording the temperature information;

storing in the plurality of a second RFID tags an identity of the first RFID tag;

the first RFID tag also transmitting to the plurality of second RFID tags the identity of the first RFID tag;

the plurality of second RFID tags comparing the identity transmitted by the first RFID tag to the identity of the first RFID tag stored in the plurality of second RFID tags;

if the identity transmitted by the first RFID tag matches the identity of the first RFID tag stored in the plurality of second RFID tags, the plurality of second RFID tags recording the temperature information, and if the identity transmitted by the first RFID tag does not match the identity of the first RFID tag stored in the plurality of second RFID tags, the plurality of second RFID tags not recording the temperature information.

2. A method as set forth in claim 1 wherein:

the first RFID tag is an active RFID tag; and the plurality of second RFID tags are passive RFID tags.

3. A method as set forth in claim 1 further comprising:

the first RFID tag also transmitting other information to the plurality of second RFID tags to enable the plurality of second RFID tags to authenticate the temperature information.

4. A method as set forth in claim 1 further comprising:

storing a shared secret in the first RFID tag and the plurality of second RFID tags;

the first RFID tag also transmitting to the plurality of second RFID tags a transmitted hash value based on the shared secret stored in the first RFID tag and the temperature information which is transmitted;

the plurality of second RFID tags independently computing a hash value based on the shared secret stored in the plurality of second RFID tags and the temperature information received from the first RFID tag, and if the transmitted hash value matches the independently computed hash value, the plurality of second RFID tags recording the temperature information, and if the transmitted hash value does not match the independently computed hash value, the plurality of second RFID tags not recording the temperature information.

5. A method as set forth in claim 1 wherein the temperature information is an indication whether the temperature exceeded a predetermined upper temperature limit.

6. An assembly for recording temperature on an RFID tag, the assembly comprising:
   a container with a first RFID tag attached to the container, the first RFID tag including a temperature sensor, the container containing a multiplicity of packages, a multiplicity of second RFID tags attached to the multiplicity of packages, respectively; and
   means within the first RFID tag for transmitting temperature information to the multiplicity of second RFID tags, and means, responsive to the transmission, within the multiplicity of second RFID tags for recording the temperature information;
   means for storing a shared secret in the first RFID tag and the multiplicity of second RFID tags;
   the first RFID tag also including means for transmitting to the multiplicity of second RFID tags a transmitted hash value based on the shared secret stored in the first RFID tag and the temperature information which is transmitted;
   the multiplicity of second RFID tags including means for independently computing a hash value based on the shared secret stored in the multiplicity of second RFID tags and the temperature information received from the first RFID tag, and
   if the transmitted hash value matches the independently computed hash value, the multiplicity of second RFID tags recording the temperature information, and
   if the transmitted hash value does not match the independently computed hash value, the multiplicity of second RFID tags not recording the temperature information.

7. An assembly as set forth in claim 6 wherein:
   the first RFID tag is an active RFID tag; and
   the multiplicity of second RFID tags are passive RFID tags.

8. An assembly as set forth in claim 6 wherein:
   the means within the first RFID tag also transmits other information to the multiplicity of second RFID tags to enable the multiplicity of second RFID tags to authenticate the temperature information.

9. An assembly as set forth in claim 6 further comprising:
   means for storing in the multiplicity of second RFID tags an identity of the first RFID tag;
   the means within the first RFID tag also transmitting to the multiplicity of second RFID tags the identity of the first RFID tag;
   the multiplicity of second RFID tags including means for comparing the identity transmitted by the first RFID tag to the identity of the first RFID tag stored in the multiplicity of second RFID tags; and
   if the identity transmitted by the first RFID tag matches the identity of the first RFID tag stored in the multiplicity of second RFID tags, the multiplicity of second RFID tags recording the temperature information, and
   if the identity transmitted by the first RFID tag does not match the identity of the first RFID tag stored in the multiplicity of second RFID tags, the multiplicity of second RFID tags not recording the temperature information.

10. An assembly as set forth in claim 6 wherein the temperature information is an indication whether the temperature exceeded a predetermined upper temperature limit.

11. A method of recording an environmental condition on RFID tags, the method comprising:
    attaching a first RFID tag to a container, the first RFID tag including an environmental condition sensor, the container containing a plurality of packages, each of a plurality of second RFID tags attached to a respective one of the plurality of packages;
    responsive to the first RFID tag transmitting environmental information to the plurality of second RFID tags, the plurality of second RFID tags recording the environmental information;
    storing in the plurality of second RFID tags an identity of the first RFID tag;
    the first RFID tag also transmitting to the plurality of second RFID tags the identity of the first RFID tag;
    the plurality of second RFID tags comparing the identity transmitted by the first RFID tag to the identity of the first RFID tag stored in the plurality of second RFID tags; and
    if the identity transmitted by the first RFID tag matches the identity of the first RFID tag stored in the plurality of second RFID tags, the plurality of second RFID tags recording the environmental information, and
    if the identity transmitted by the first RFID tag does not match the identity of the first RFID tag stored in the plurality of second RFID tags, the plurality of second RFID tags not recording the environmental information.

12. A method as set forth in claim 11 wherein:
    the first RFID tag is an active RFID tag; and
    the plurality of second RFID tags are passive RFID tags.

13. A method as set forth in claim 11 further comprising:
    the first RFID tag also transmitting other information to the plurality of second RFID tags to enable the plurality of second RFID tags to authenticate the environmental information.

14. A method as set forth in claim 11 further comprising:
    storing a shared secret in the first RFID tag and the plurality of second RFID tags;
    the first RFID tag also transmitting to the plurality of second RFID tags a transmitted hash value based on the shared secret stored in the first RFID tag and the environmental information which is transmitted;
    the plurality of second RFID tags independently computing a hash value based on the shared secret stored in the plurality of second RFID tags and the environmental information received from the first RFID tag, and
    if the transmitted hash value matches the independently computed hash value, the plurality of second RFID tags recording the environmental information, and
    if the transmitted hash value does not match the independently computed hash value, the plurality of second RFID tags not recording the environmental information.

15. A method as set forth in claim 11 wherein the environmental information is an indication whether the environmental condition exceeded a predetermined upper environmental condition limit.

16. A method as set forth in claim 11 wherein the environmental condition is humidity.

17. A method as set forth in claim 11 wherein the environmental condition is vibration or shock.

* * * * *